UNITED STATES PATENT OFFICE.

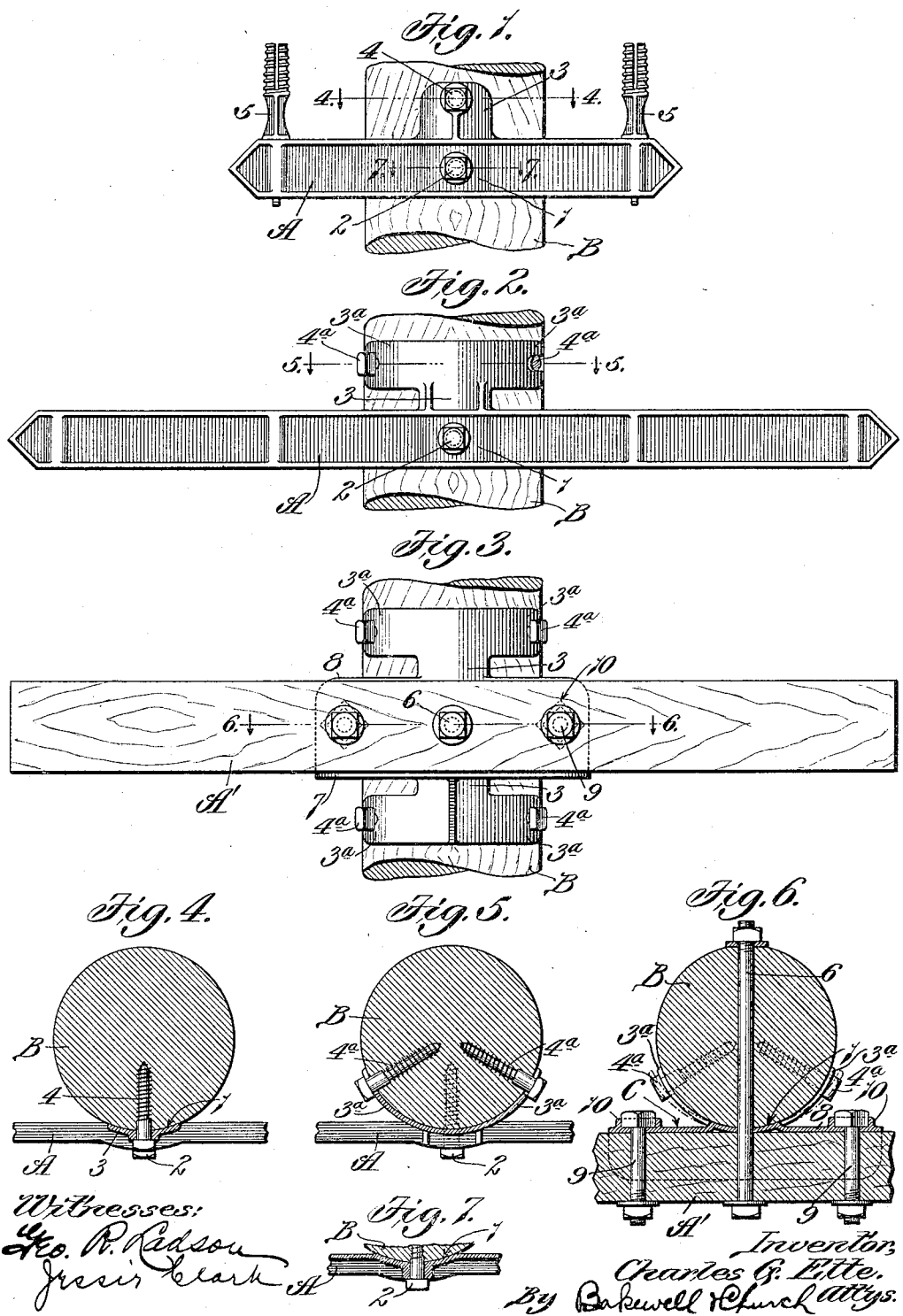

CHARLES G. ETTE, OF ST. LOUIS, MISSOURI, ASSIGNOR TO ST. LOUIS MALLEABLE CASTING COMPANY, OF ST. LOUIS, MISSOURI, A CORPORATION OF MISSOURI.

POLE CROSS-ARM.

1,173,418.  Specification of Letters Patent.  Patented Feb. 29, 1916.

Application filed March 1, 1915. Serial No. 11,318.

*To all whom it may concern:*

Be it known that I, CHARLES G. ETTE, a citizen of the United States, residing at St. Louis, Missouri, have invented a certain new and useful Improvement in Pole Cross-Arms, of which the following is a full, clear, and exact description, such as will enable others skilled in the art to which it appertains to make and use the same.

This invention relates to pole cross arms, and has for its main object to provide a cross arm which is so constructed that it is not necessary to notch out or cut a gain or recess in the face of a pole or tree to receive the cross arm.

Another object is to provide a pole cross arm that comprises a curved pole-engaging surface and a vertically disposed portion through which a fastening device can be inserted at a point above or below the cross arm, said curved surface and vertically disposed portion serving to prevent the cross arm from turning horizontally and twisting vertically, and thus performing the same function as the usual notch or gain in the face of the pole and the inclined braces now usually attached to the pole and to the ends of the cross arm.

Another object is to provide a pole cross arm which is so designed that lag screws may be used for securing it to the pole or tree on which it is mounted, thus overcoming the necessity of forming one or more holes in the pole to receive through bolts, and consequently, avoiding injury to a tree or reducing the strength of a pole. And still another object is to provide a cross arm having the characteristics above mentioned which can be used on poles and trees of various diameters by simply striking certain portions of the cross arm a few blows with a hammer, so as to bend said portions and make them conform accurately to the shape of the pole or tree on which the cross arm is being mounted.

Broadly stated, my invention consists in a pole cross arm provided on its rear side with a curved surface that has an extended bearing surface on the pole or tree on which the cross arm is mounted, and also provided with a vertically disposed portion through which a fastening device can be inserted at a point above or below the cross arm, so as to prevent it from tilting vertically. It is immaterial, so far as my broad idea is concerned, whether said curved bearing surface and said vertically disposed portion are formed integral with the cross arm or are formed on a separate and distinct member to which the cross arm is detachably connected, and therefore, I have herein illustrated and described both forms of my invention,—one form consisting of a metal cross arm provided with an integral curved surface and a vertically disposed portion, and the other form consisting of a separate member provided with such a surface and portion and also having means to which a cross arm can be attached.

Figure 1 of the drawings is a front elevational view of a short metal cross arm constructed in accordance with my invention. Fig. 2 is a front elevational view, illustrating a slight modification of my invention. Fig. 3 is a front elevational view of a cross arm in which the portion that engages the pole consists of a member to which the cross arm proper is detachably connected; Figs. 4, 5 and 6 are cross-sectional views taken on the lines 4—4 of Fig. 1, 5—5 of Fig. 2 and 6—6 of Fig. 3, respectively; and Fig. 7 is a detail sectional view taken on the line 7—7 of Fig. 1.

In the form of my invention illustrated in Fig. 1 A designates a metal cross arm which is provided on its rear side with a curved bearing surface 1 that conforms to the outer surface of the pole or tree B on which the cross arm is mounted, said curved surface 1 being of relatively great area so that the cross arm will have sufficient bearing on the pole to prevent the cross arm from turning horizontally in either direction when one end or the other of the cross arm is subjected to a horizontal pull or strain. A fastening device 2 is inserted through the center of the cross arm, so as to securely connect it to the pole, said fastening device preferably consisting of a lag screw, although it may consist of a through bolt. In order to prevent the cross arm from twisting or tilting vertically when one end or the other of same is subjected to a vertical pull or strain, I have provided it with a vertically disposed portion 3, through which a fastening device 4 can be inserted at a point some distance above the fastening device 2. The vertically disposed portion 3 may project either upwardly or downwardly from the cross arm, and if desired, the rear side of same that bears against the pole may have the same curvature as the curved bearing surface 1 previously mentioned. By forming a cross arm in this manner I overcome the necessity of forming a notch or recess in the face of the pole to receive the cross arm, as the curved bearing surface 1 on the rear side of the cross arm effectively prevents the cross arm from turning or twisting horizontally. I also overcome the necessity of using braces to hold the cross arm straight and prevent the ends of same from sagging, for the two fastening devices 2 and 4 are located far enough apart to overcome any tendency of the cross arm to tilt vertically when one end or the other of same is subjected to an abnormal vertical pull or strain. Consequently, a cross arm constructed in this manner can be installed quickly; it does not require a tree to be injured or defaced when a tree is used for supporting the cross arm and it can be securely connected to a pole without weakening the pole by forming a notch in same to receive the cross arm and a hole in same to receive the through bolt. In addition to the desirable features above mentioned, such a cross arm can be manufactured and sold at a low cost, as no inclined braces are required to prevent the cross arm from sagging.

For short cross arms, such, for example, as the one illustrated in Fig. 1, which is designed to carry two insulator pins 5, one vertically disposed portion 3, projecting either upwardly or downwardly from the cross arm, is sufficient to prevent the cross arm from tilting vertically, but for long cross arms, such as that shown in Fig. 2, I prefer to provide the vertically disposed portion 3 with laterally projecting wings or arms 3ª that are curved so that they will embrace or partly surround the pole, and thus increase the horizontal bearing surface of the cross arm on the pole and also enable fastening devices 4ª to be inserted through said arms at points some distance from either side of the center fastening device 2. In such a structure the three fastening devices that secure the cross arm to the pole are arranged in triangular relation to each other, so that the cross arm is effectively braced against vertical turning or twisting, and as the two fastening devices 4ª are arranged at an angle to each other and also at an angle to the center fastening device 2, it is practically impossible for said fastening devices to pull out of the hole when the cross arm is subjected to a strain in a direction tending to pull it away from the pole. This feature of being able to securely fasten the cross arm to the pole by means of lag screws is very important from a practical standpoint, as it materially reduces the time required to erect the cross arm and also avoids injury of the supporting structure and weakening same by forming a hole to receive a through bolt of the kind now generally used for securing a cross arm in position. The cross arm proper with the curved surface and the vertically disposed bracing portion formed integral therewith is preferably formed from malleable iron and the laterally projecting wings 3ª on the bracing portion 3 are preferably made thin enough so that they can be bent easily by a blow of a hammer, so as to make them conform accurately to the shape of the pole or tree to which the cross arm is attached during the operation of installing the cross arm.

If desired, a similar bracing portion consisting of a vertical shank provided with laterally projecting wings can be provided on the underside of the cross arm, as shown in Fig. 3, such a construction being particularly adapted for very long cross arms. As previously stated, it is immaterial whether the curved pole-engaging surface and the bracing portion are formed integral with the cross arm proper or are formed on a separate member to which the cross arm is detachably connected. In Fig. 3 of the drawings I have illustrated a cross arm constructed in this manner, the reference character A' designating a cross arm either of wood or metal that is detachably connected to a metal member C provided on its rear side with a curved bearing surface 1, as shown in Fig. 6, that bears against the outer surface of the pole B, and having vertically disposed portions 3 projecting upwardly and downwardly from same, and provided with laterally projecting wings or arms 3, through which fastening devices 4ª, preferably lag screws, are driven into the pole. Four lag screws 4ª and a through bolt 6 may be used for securing the member C to the pole, or a lag screw can be substituted for the center through bolt 6. The member C is provided with a horizontally disposed flange 7 on which the cross arm A' rests, and it is also provided with a vertically disposed wall 8 to which the cross arm is securely connected by bolts or other suitable fastening devices 9, as shown in Fig. 6, said vertically disposed wall 8 being provided on its rear side with pockets or lugs 10, so as to receive the heads on the bolts 9 or bear against said heads, and thus prevent the bolts from rotating when the nuts on the front ends of same are being tightened. The member C acts as a saddle for the cross arm A' and is preferably formed of malleable iron, so as to produce a strong and serviceable device at a low cost, and also enable the wings or laterally projecting arms on the braces of same to be bent easily into snug engagement with the outer surface of the pole or tree to which the saddle is connected.

Having thus described my invention, what I claim, and desire to secure by Letters Patent, is:

The combination of a pole, a cross arm provided with a vertically-disposed portion that has curved wings projecting laterally therefrom in a different horizontal plane than the plane in which the cross arm lies, a fastening device projecting into the pole through an opening at the center of the cross arm, and fastening devices projecting into the pole through openings in the ends of said wings and arranged at an angle with relation to each other.

In testimony whereof I hereunto affix my signature in the presence of two witnesses, this twenty-sixth day of February 1915.

CHARLES G. ETTE.

Witnesses:
WILLIAM L. SCHROEDER,
WALTER C. RAITHEL.

Copies of this patent may be obtained for five cents each, by addressing the "Commissioner of Patents, Washington, D. C."